(12) United States Patent
Wright et al.

(10) Patent No.: US 12,135,751 B1
(45) Date of Patent: Nov. 5, 2024

(54) SYSTEMS AND METHODS FOR GENERATING ENVIRONMENTAL, SOCIAL, AND GOVERNANCE (ESG) INTEREST REPORTS AND EVENT MODELS

(71) Applicant: United Services Automobile Association (USAA), San Antonio, TX (US)

(72) Inventors: Susan Elizabeth Wright, San Antonio, TX (US); Janelle Denice Dziuk, Falls City, TX (US); Rachel Michelle Ballew, San Antonio, TX (US); Jeremy Gerald Johnson, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/707,610

(22) Filed: Mar. 29, 2022

(51) Int. Cl.
*G06F 16/9535* (2019.01)
*G06F 16/951* (2019.01)
*G06Q 50/00* (2012.01)

(52) U.S. Cl.
CPC ........ *G06F 16/951* (2019.01); *G06F 16/9535* (2019.01); *G06Q 50/01* (2013.01)

(58) Field of Classification Search
CPC .... G06F 16/951; G06F 16/9535; G06Q 50/01
See application file for complete search history.

(56) References Cited

U.S. PATENT DOCUMENTS

| | | | |
|---|---|---|---|
| 2012/0316916 A1* | 12/2012 | Andrews | G06Q 50/01 |
| | | | 705/7.29 |
| 2014/0279014 A1* | 9/2014 | Roka | G06Q 30/0267 |
| | | | 705/14.58 |
| 2017/0004128 A1* | 1/2017 | Yoon | G06F 40/295 |
| 2019/0279101 A1* | 9/2019 | Habti | G06F 16/2456 |
| 2021/0256084 A1* | 8/2021 | Marsh | G06Q 40/06 |
| 2021/0365486 A1* | 11/2021 | Yoon | G06F 18/22 |
| 2022/0343433 A1* | 10/2022 | Yan | G06Q 40/06 |

* cited by examiner

*Primary Examiner* — Etienne P Leroux
*Assistant Examiner* — Oscar Wehovz
(74) *Attorney, Agent, or Firm* — Fletcher Yoder P.C.

(57) ABSTRACT

A method may include scraping published internet data from one or more data sources based on or more environmental parameters, one or more social parameters, or one or more governance parameters. The method may also include receiving user data from an account database, a user device, or both; identifying correlations between the user data and the published internet data; wherein the correlations are associated with environmental parameters, social parameters, or governance parameters. The method may also include generating a dynamic interest report based on the correlations, wherein the dynamic interest report comprises recommendations of one or more events, one or more content items, or both associated with environmental, social, and governance (ESG) compliance. The method may then involve sending the dynamic interest report to the user device.

20 Claims, 4 Drawing Sheets

SYSTEMS AND METHODS FOR GENERATING ENVIRONMENTAL, SOCIAL, AND GOVERNANCE (ESG) INTEREST REPORTS AND EVENT MODELS

BACKGROUND

The present disclosure relates generally to identify recommended environmental, social, and governance (ESG) activities for an individual. More particularly, the present disclosure is related to dynamically generating an ESG interest report and an ESG event model based on scraped internet data and user data.

As individuals become more concerned with their environmental, social, and governance (ESG) impact on society, they may seek out activities and organizations that adhere to or promote ESG compliance. In some cases, ESG compliance is associated with a contribution to certain ethics or consciousness topics for users and/or organizations. That is, users that focus on certain aspects of their daily life in line with compliance of certain ESG measurements may benefit from an improved reputation, such as positive public sentiments in their communities. Additionally, organizations that focus on certain aspects of their operations in line with compliance of certain ESG measurements may benefit from an improved reputation, as well as positive public sentiments in their communities. However, users and/or organizations may find it difficult to locate ESG-related activities within their greater community, find details related to one or more ESG-related causes, and/or coordinate attendance to ESG-related activities. With this in mind, improved systems and methods for identifying and presenting ESG-related activities to the user may be desired.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, these statements are to be read in this light, and not as admissions of prior art.

BRIEF DESCRIPTION

In one embodiment, a method may include scraping published internet data from one or more data sources based on the one or more environmental parameters, the one or more social parameters, the one or more governance parameters, or any combination thereof. The method may also include receiving user data from an account database, a user device, or both, identifying, via the processor, one or more correlations between the user data and the published internet data, wherein the one or more correlations are associated with one or more environmental parameters, one or more social parameters, one or more governance parameters, or any combination thereof, and generating, via the processor, a dynamic interest report based on the one or more correlations, wherein the dynamic interest report comprises one or more recommendations, wherein the one or more recommendations comprise one or more events, one or more content items, or both associated with environmental, social, and governance (ESG) compliance. The method may then involve sending the dynamic interest report to the user device.

DRAWINGS

These and other features, aspects, and advantages of the present disclosure will become better understood when the following detail description is read with reference to the accompanying drawings in which like characters represent like parts throughout the drawings, wherein.

DETAILED DESCRIPTION

Figure 1:
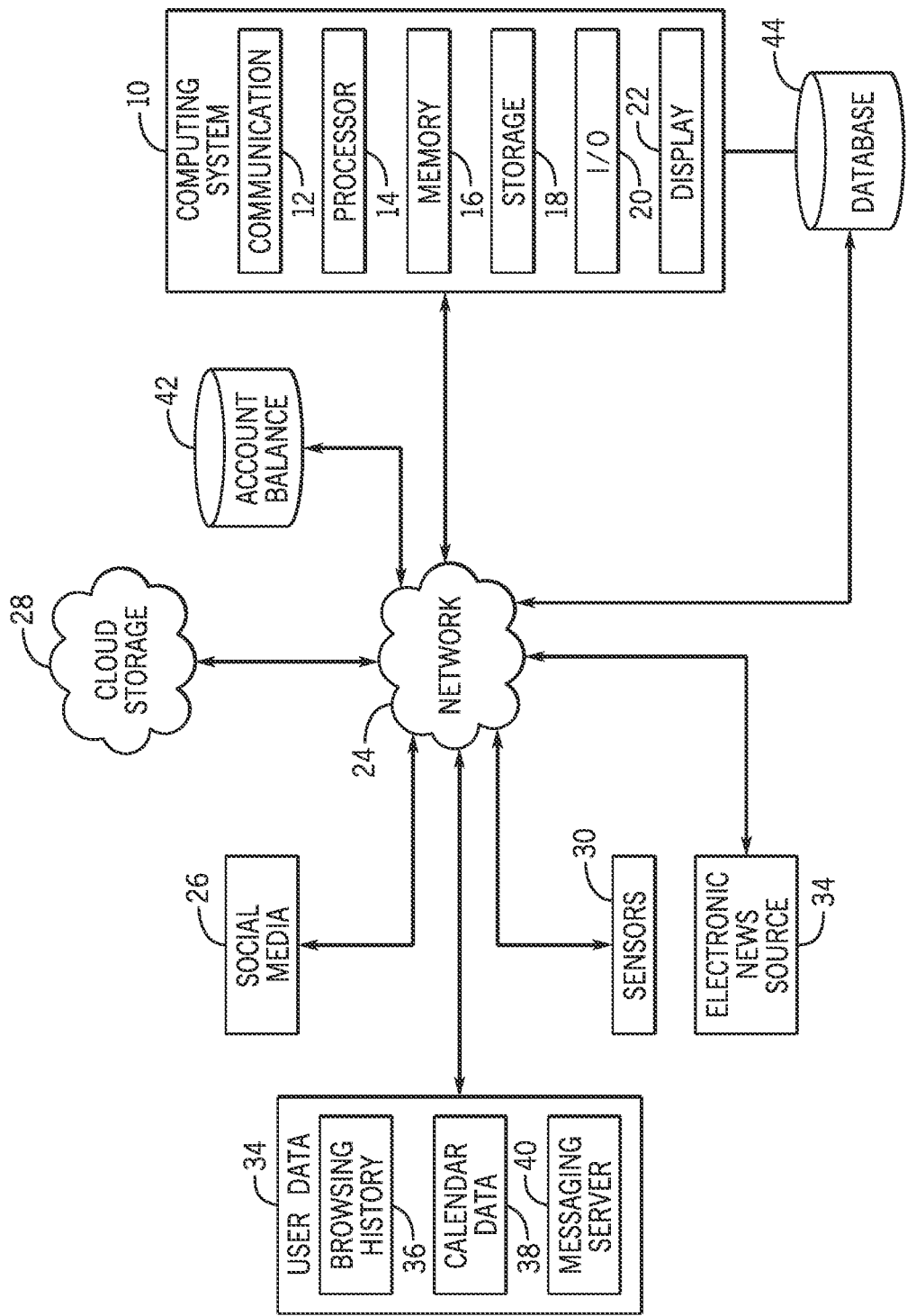
FIG. 1 illustrates a block diagram of a system communicatively coupled to a number of online data sources and a user device, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiment of the present disclosure, the articles "a," "an," "the," and "said" are intended to mean that there are one or more of these elements. The terms "comprising," "including," and "having" are intended to be inclusive and mean that there may be additional elements other than the listed elements.

As discussed above, a user may engage in one or more activities (e.g., events) and/or with one or more content items (e.g., websites, profiles, videos) associated with environmental, social, and governance (ESG) compliance. In some embodiments, the user may be an individual or a group of individuals (e.g., a business). For example, in certain years, organizations may donate to a variety of different charitable organizations but it may be difficult to identify the individuals that benefit from the charitable investments. In some embodiments, an artificial intelligence (AI) tool or machine learning algorithm may scrape internet data sources (e.g., social media websites, electronic new sources, cloud storage) to capture insight into causes (e.g., charities, groups) that benefit from the charitable investments. That is, individuals and communities that benefit from various investments and donations may be tracked at a more granular level (e.g., social media posts, news stories), and members of the donating organization may be apprised of the activities funded by their donations and support. In this way, organizations may generate additional support for the same causes and provide members with more insightful feedback with regard to the ESG activities of the organizations.

With this in mind, the AI tool may crawl social media posts and other internet and print media sources to gather information related to the charitable investments, volunteer efforts, events, and the like. The collected data may be stored in a database with metadata related to the type of ESG content, a location associated with the content, an accessible link to the original content, and the like. In some embodiments, the AI tool may then generate a personalized report with interactive elements for each individual. That is, the AI tool may send a personalized report to the individual that is associated with the scraped data or ESG interests of the individual, so that the individual may be aware of the ESG tasks undertaken by the organization.

The report (e.g., relevant ESG per member report) may be automatically generated based on personal preferences indicated by the organization or determined by the organization via machine learning. For example, if the organization determines that the individual values, local community investments, the organization may provide a report with links related to the activities the organization has performed in the individual's geographical area. As the individual interacts with the report, an updated model for the individual may be generated to determine or identify other types of involvement/commitment (e.g., where they live, graduated from, branch of service) that the individual may value. The collected data and generated models may be employed to identify other potential new participants or events where likely future individuals may be in attendance.

The report may also include dynamic content. The data provided in the report may be quantified by demonstrating number of individuals impacted, monetary costs, provide stories with regard to how the individual benefited from the organization, and the like. As such, instead of providing aggregated numbers, the report may include relatable stories and events for the individual.

Additionally, different departments of the organization may attempt to contribute to charitable investments or events in different ways—donations, community events (e.g., blood drive, canned food drive), etc. Unfortunately, many tasks undertaken by one department are performed without knowledge or coordination from other departments of the same organization. As such, the AI tool or machine learning algorithm may create a model to capture the aggregated ESG efforts from a number of different departments and sources.

In some embodiments, calendar data for individuals associated with the departments may be monitored to identify events occurring in certain departments. After identifying these events, the machine learning model may identify other departments or individuals that may have a level of interest in the event. For instance, a military affairs group may be sponsoring a luncheon as a morale boost for troops. However, the costs of the event may not be tracked by the charitable group of the organization to capture the investment in the community. In some cases, the calendar data from individuals associated with the military affairs group may be scraped to identify upcoming events, key words, phrases, addresses, and additional information may be used to cross reference with scraped data from individuals from other departments. The event data may be sent to other individuals not associated with the event. In some embodiments, a digital bulletin board may be updated for individuals based on the identified correlations.

Similarly, event data associated with an excursion may be shared across departments to increase resource efficiency usage. For instance, when one or more individuals from different departments are going to be in a particular geographical location, the machine learning system may track this occurrence and send information related to the individuals present in the particular geographical location during the same time period to allow the individuals to share ride resources, attend events, and the like. In this way, the present embodiments described herein may result in improved ESG compliance with individuals and organizations to provide a more positive impact while remaining environmentally and socially conscious in the respective communities.

With the foregoing in mind, FIG. 1 illustrates a block diagram of a system communicatively coupled to a number of online data sources and a user device, such that the system may facilitate scraping of data related to environmental, social, and governance behaviors, activities, and/or content items associated with individuals, organizations, and the like. The system may include a computing system 10 communicatively coupled to a variety of data sources. The computing system 10 may include various types of components that may assist the computing system 10 in performing various types of computer tasks and operations. For example, the computing system 10 may include a communication component 12, a processor 14, a memory 16, a storage 18, input/output (I/O) ports 20, a display and the like.

The communication component 12 may be a wireless or wired communication component that may facilitate communication between the computing system 10 and various other computing systems and devices via a network, the Internet, or the like. For example, the communication component 12 may allow the computing system 10 to obtain the data from the variety of data sources, such as database data (e.g., insurance database, sensor data database), cloud storage data, computer systems (e.g., smart phones, laptops, security devices), or any suitable storage component. The communication component 12 may receive and send notifications to the smart devices and the calendar data 38. The communication component 12 may use a variety of communication protocols, such as Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The processor 14 may process instructions for execution within the computing system 10. The processor 14 may include single-threaded processor(s), multi-threaded processor(s), or both. The processor 14 may process instructions stored in the memory 16. The processor 14 may also include hardware-based processor(s) each including one or more cores. The processor 14 may include general purpose processor(s), special purpose processor(s), or both. The processor 14 may be communicatively coupled to other internal components (such as the communication component 12, the storage 18, the I/O ports 20, and the display 22).

The memory 16 and the storage 18 may be any suitable articles of manufacture that can serve as media to store processor-executable code, data, or the like. These articles of manufacture may represent computer-readable media (e.g., any suitable form of memory or storage) that may store the processor-executable code used by the processor 14 to perform the presently disclosed techniques. As used herein, applications may include any suitable computer software or program that may be installed onto the computing system 10 and executed by the processor 14. The memory 16 and the storage 18 may represent non-transitory computer-readable media (e.g., any suitable form of memory or storage) that may store the processor-executable code used by the processor 14 to perform various techniques described herein. It should be noted that non-transitory merely indicates that the media is tangible and not a signal.

The I/O ports 20 may be interfaces that may couple to other peripheral components such as input devices (e.g., keyboard, mouse), sensors, input/output (I/O) modules, and the like. The display 22 may operate as a human machine interface (HMI) to depict visualizations associated with software or executable code being processed by the processor 14. In one embodiment, the display 22 may be a touch display capable of receiving inputs from an operator of the computing system 10. The display 22 may be any suitable type of display, such as a liquid crystal display (LCD), plasma display, or an organic light emitting diode (OLED) display, for example. Additionally, in one embodiment, the display 22 may be provided in conjunction with a touch-sensitive mechanism (e.g., a touch screen) that may function as part of a control interface for the computing system 10.

It should be noted that the components described above with regard to the computing system 10 are examples. Indeed, the computing system 10 may include additional or fewer components relative to the illustrated embodiment.

In certain embodiments, the computing system 10 may be communicatively coupled to a network 24, which may include collections of computing systems, the Internet, an Intranet system, or the like. The network 24 may facilitate communication between the computing system 10 and various other data sources. For example, the computing system 10 may use a connection to the network 24 to scrape data from various data sources. That is, the network 24 may be communicatively coupled to one or more data sources, where the data sources may include social media data 26, cloud storage data 28, sensor data 30, electronic news sources data 32, and/or a connection to a user device 34. The social media data 26 may include data from one or more social media sites, where the data may include text data, image data, video data, audio data, event data, profile data, profile connections data, and/or calendar data. In some embodiments, the one or more social media sites may be associated with the user. Furthermore, the social media data 26 may be scarped from specific profiles associated with ESG compliance, such as charities, non-profits, and/or any other organization that promotes ESG compliance. The cloud storage data 28 may include previously identified and stored data associated with the user, such as text data, image data, video data, audio data and/or any other data stored in the cloud storage. In some embodiments, the cloud storage data 28 may be identified from one or more different third-party cloud storage services associated with the user.

The sensor data 30 may include data from sensors associated with the user, such as sensors associated with a property and/or a vehicle associated with the user. In some embodiments, the sensor data may include data sourced from one or more smart devices, location sensors (GPS), a security system, internal sensors, external sensors, one or more appliances, computer systems, and/or an unmanned aerial vehicle (UAV). The one or more smart devices may be any suitable electronic devices that are context-aware and are capable of performing autonomous computing and connecting to other devices for data exchange. The one or more smart devices may also be a mobile device, a mounted device a wearable device, or any other device capable of receiving command signals to perform a scheduled or requested activity. For example, the one or more smart devices may include smart plugs, smart thermostat, smart lights, smart cleaners, a light switch, a garage door, a smart camera, a smart lock, and the like that may be controlled by various other devices and data sources that are communicatively coupled to the one or more smart devices. The security system may include a central security device, smart doorbells, cameras, and/or smart locks. The security system may record audio, image, and/or video data of the property. The internal sensors may be any suitable electronic device and/or sensor that monitors characteristics inside of the property, such as pressure, moisture, temperature, humidity, light, movement, and the like. The external sensors may be any suitable electronic device and/or sensor that monitors characteristics of the exterior and the surrounding area of the property, such as pressure, moisture, temperature, humidity, light, movement, and the like. The one or more appliances may include washing machines, dish washing machines, heating, ventilation, and air conditioning units (HVAC units), televisions, and the like. The computer systems may be any suitable electronic device which is used as a computing device associated with the property, such as a desktop computer, a laptop computer, a tablet, a video game console, servers, a cellular device, and the like. The UAV may provide image data of the area surrounding the property.

Furthermore, the sensor data 30 may include vehicle data related to the vehicle associated with the user. The vehicle may have one or more sensors to record vehicle data. These sensors may consist of a global positioning system (GPS), an odometer, a weight/load calculator, a level sensor for the gas tank, a Light Detection and Ranging sensor (LIDAR), light sensors, pressure sensors, Anti-Lock Braking system (ABS), Revolutions-Per-Minute sensor (RPM), temperature sensors, and other sensors that may provide information regarding the operation or location of the vehicle. Furthermore, the vehicle data may include vehicle operation features. In particular, vehicle operation features may consist of maximum speed, self-parking features, cruise control capability, access to camera systems, access to Wi-Fi hotspots, access to an autonomous driving mode, and the like. Each electronic device connected to an outlet in the property to receive electricity may be connected via a smart plug, where the smart plug tracks electricity usage of the electronic device.

The electronic news sources data 32 may include data identified from one or more electronic news sources. The one or more electronic news sources may be verified or unverified news sources associated with local, national, and/or international news. In some embodiments, the electronic news sources data 32 may be audio data (e.g., online live and recorded news radio recordings), video data (e.g., live and recorded news broadcasts), and/or text data (e.g., news websites). Furthermore, the electronic news sources data 32 may include individual articles, event calendars, and/or any other additional posts associated with ESG compliance.

The user device 34 may include browsing history 36, calendar data 38, messaging data 40, and/or any additional data associated with the user device and related to ESG compliance/activities. The browsing history 36 may include previously and/or actively visited websites from the user device 34. Additionally, the browsing history 36 may include previously and/or actively used applications on the user device 34. The calendar data 38 may include previously attended and/or future events associated with ESG compliance. The calendar data 38 may be scraped from one or more calendars on the user device 34. In some embodiments, the calendar data 38 may be scraped from calendars associated with one or more individuals associated with an organization. The messaging data 40 may include any messaging data from one or more messaging services, such as text messages, social media messages, email, phone history, and/or any additional relevant message data associated with ESG compliance.

The network 24 may be communicatively coupled to an account database 42 to identify data associated with an account associated with a user. The account database 42 may store information regarding the user, such as physical characteristics, possessions, location, age, risk profile of the user (e.g., claim history, credit score, rental history), and other information that may be associated with the account of the user. Furthermore, the network 24 and/or the computing system 10 may be communicatively coupled to a database 44, where scraped internet data from the network 24 may be stored. Additionally, the database 44 may store previously identified data.

Referring back to the one or more data sources, in certain embodiments, the data sources may provide data related to the visual and physical characteristics of the property. By way of example, the smart devices, the security systems, the internal sensors, and/or the external sensors may correspond with devices (e.g., pet camera, security camera, smart doorbell, smart lock), which may be disposed of inside or outside of the property and may capture sensor data 30 (e.g., safety data, internal sensor data, external sensor data, smart device data, appliance data, vehicle data, wearable data) corresponding with the property. In another example, the smart devices, the internal sensors, and/or the external sensors may correspond with one or more devices (e.g., smart plugs, smart lights), which monitor certain properties about the property, such as electricity usage, air quality, living habits, and the like (e.g., internal sensor data, external sensor data, smart device data, and/or appliance data). In some embodiments, the one or more data sources may be communicatively coupled to other computing devices (e.g., mobile phones, tablet devices, desktop/laptop computers), which may allow the user to monitor and control operations of the one or more data sources. The computing system 10 may use the communication component 12 to receive sensor data 30 generated by the one or more data sources and may store the sensor data 30 in the databases 44. The sensor data 30 acquired by the one or more data sources may be used to determine visual and physical characteristics of the property, possessions within the property, new features related to the property, and the like.

As discussed above, a dynamic interest report based on the user's personal preferences, interests, and scraped internet data may be generated to provide recommendations of ESG related events and/or organizations to the user. Indeed, the computing system 10 may scrape published internet data to identify ESG related events and/or organizations that may include one or more events and/or organizations associated with the ESG components that may be of interest to the user. In this way, the user may become informed or participate in the one or more events and/or organizations based on the user's interests and/or preferences. That is, the dynamic interest report may provide interactive components that provide the user the ability to gain more insight be associated with an organization and/or one or more components of ESG compliance.

Figure 2:
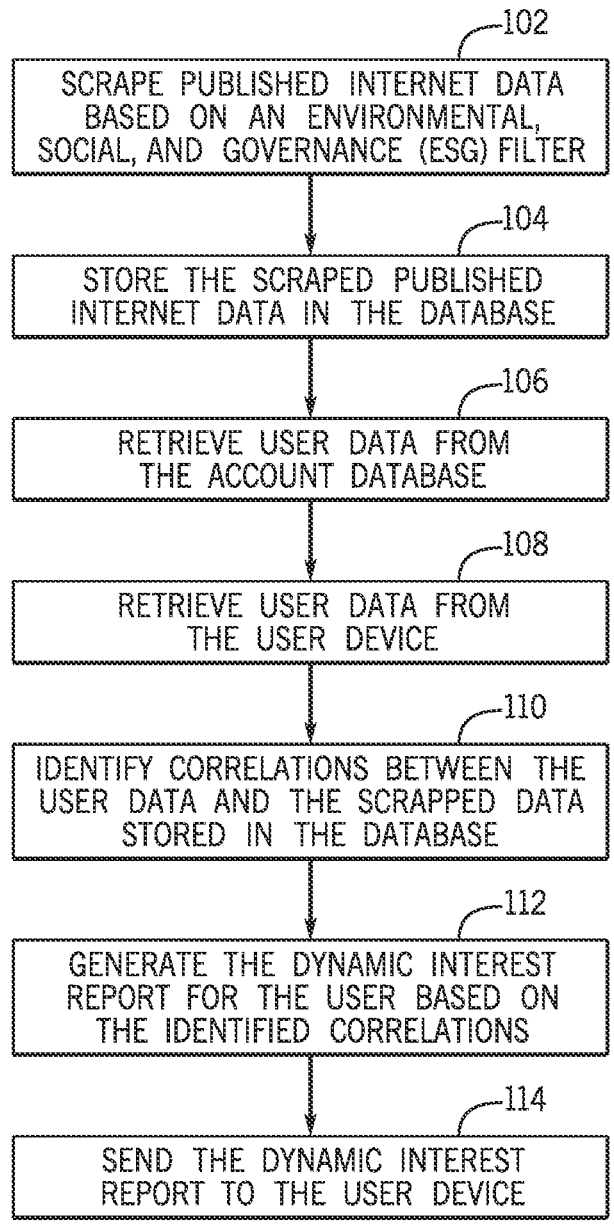
FIG. 2 illustrates a flowchart of a method for generating a dynamic interest report for a user, in accordance with an embodiment.

With the foregoing in mind, FIG. 2 illustrates a method 100 for generating the dynamic interest report for a user. Although the method 100 is described as being performed by the computing system 10, it should be noted that method 100 may be performed by any suitable electronic device with one or more processors and in any suitable order.

At block 102, the computing system 10 may scrape published internet data based on environmental, social, and governance (ESG) filters. The computing system 10 may scrape the published internet data by actively accessing or retrieving the internet published data. The computing system 10 may focus on a certain identifiers such as particular tags (e.g., hashtag, keywords, etc.), nicknames, people, companies, images, subscribed to content, and the like. In some embodiments, the computing system 10 may identify one or more linked content (e.g., a hyperlink to another webpage and/or content item) in the published internet data. Furthermore, scraped published internet data may be associated with one or more organizations and/or charitable donations from the one or more organizations. In some embodiments, the identifiers may be based on the charitable donations from the one or more organizations. Each aspect of the ESG filter may be associated with particular internet published data.

By way of example, the environmental filter may be associated with environmentally conscious events, actions performed by organizations to promote environmental consciousness, environmentally-friendly purchases, actions to combat climate change, preservation of natural resources, combating pollution and waste, renewable energy projects, and any other activity that may be associated with a low-emission, environmentally friendly action. That is, the environmental filter may generally identify events and information related to environmental causes.

The social filter may be associated with equality promoting measures, human rights, labor standards, exposure of illegal and immoral actions, local community promotions, improved access to healthcare, communications, finance, product safety, non-controversial sourcing of materials, and any other activity that may be associated with a positive societal impact. Furthermore, the governance filter may be associated with ethical business decisions, anti-competitive practices, tax and income transparency, anti-corruption tactics, financial stability, diversity-focused hiring and practices, moral accounting, general transparency, and any other activity that may be associated with ethical business practices.

With this is mind, the computing system 10 may monitor one or more types of content from online data sources, such as posts on one or more social media websites, news headlines/articles from one or more electronic news sources, and other suitable network-accessible locations. The computing system 10 may cross-reference headline data, posts, metadata, and/or other searchable data format with each component of the ESG filters. By way of example, a post on a social media website that includes a reference to the environment (e.g., a hashtag, such as #environment) may be identified via the environmental filter. In another example, a news headline that includes a reference to a particular charity organization that is related to an interest of the user may be identified via the social filter.

At block 104, the computing system 10 may store the scraped data in the database 44. The data may be stored such that the scraped data is associated with a respective component of the ESG filter (environmental, social, and governance). In some embodiments, the scraped data may be assigned to a group associated with the data source (e.g., social media data 26, cloud storage data 28, sensor data 30, and/or electronic news sources data 32) when stored in the database 44. By way of example, the scraped data from a post on a social media website may be assigned to a social media group that is associated with a particular topic (e.g., environmental, social, or governance component), where the social media group is associated with the social media data 26 and includes all scraped data from one or more types of interactions (e.g., posts, following another user or group, re-posting of a post) with one or more different social media websites. In this way, the social media group may collect data from various sources that are related to similar topics. As a result, the computing system 10 may query the social media group to identify correlations based on a particular topic (e.g., environmental, social, or governance components) and generate a report more efficiently, as will be described below.

At block 106, the computing system 10 may retrieve user data from the account database 42. As discussed above, the user data from the account database 42 may include physical characteristics, possessions, location, age, risk profile of the user (e.g., claim history, credit score, rental history), a current ESG compliance score, and/or other information that may be associated with the account of the user. In some embodiments, the computing system 10 may request user data from the user device 34.

At block 108, the computing system 10 may retrieve user data from the user device 34. As discussed above, the user data from the user device 34 may include the browsing history 36, the calendar data 38, the messaging data 40, and/or any additional data associated with the user device and related to ESG compliance/activities. The browsing history 36 may include previously or actively visited websites from the user device 34. The calendar data 38 may include previously attended or future events associated with ESG compliance. Additionally, the calendar data 38 may include event data not associated with ESG compliance, such as personal, work, and/or family related event data. The messaging data 40 may include any suitable messaging data from one or more messaging services, such as text messages, social media messages, email, phone history, and/or any additional relevant message data associated with ESG compliance. Furthermore, the user data from the user device 34 may include location data, usage data, additional application data, and/or any other additional data from the user device 34.

At block 110, the computing system 10 may identify correlations between the user data collected at blocks 106 and 108 and the scraped data collected at block 102. The correlations between the user data and the scraped data may include identifications of similar event types (e.g., similar filtered data) between the user data and the scraped data. By way of example, the calendar data 38 from the user device 34 may include an event for picking up waste at a protected park in the local community. The computing system 10 may identify additional events for cleaning up waste at the same/different protected areas in the local community and/or nearby communities from the scraped data. In this way, the computing system 10 may cross reference calendar data with the scraped data to find matching categories, events, or the like.

In another example, the browsing history 36 may include websites associated with a social cause. The computing system 10 may identify donations made by one or more organizations to the social cause based on the browsing history 36. In this way, the computing system 10 may identify similarities and associations between the user data from the user device 34 and the scraped data.

At block 112, the computing system 10 may generate the dynamic interest report for the user based on the correlations identified at block 110. The computing system 10 may generate one or more recommendations (e.g., events, organizations, and/or social causes) based on the identified correlations. That is, in some embodiments, the computing system 10 may generate the one or more recommendations to improve the environmental, social, or governance compliance of the user based on the types of activities that the user data indicated as being performed. By using the identified correlations to generate the one or more recommendations, the user is more likely to engage with the one or more recommendations because the recommendations are in line with the user's interests. In some embodiments, the dynamic interest report may be associated with a particular organization and may include one or more recommendations associated with the particular organization. In some embodiments, each recommendation provided in the dynamic interest report may be accompanied by quantified data. By way of example, the quantified data may include a number of individuals impacted, monetary donations currently received, and the like. In addition, each recommendation may include a link to a website or data storage that provides one or more stories describing how the event or organization associated with the recommendation has been useful to others. The computing system 10 may present the one or more recommendations to the user on a display of the user device 34. An example structure of the dynamic interest report will be discussed further below in FIG. 3.

At block 114, the computing system 10 may send the dynamic interest report to the user device 34. The user may be notified via a push-notification on the display of the user device 34 when the dynamic interest report is received by the user device 34. In some embodiments, the user device 34 may determine if there is a pre-existing dynamic interest report. If the user device 34 determines that there is the pre-existing dynamic interest report, the user device 34 may store the pre-existing dynamic interest report in memory of the user device 34. Additionally, the user device 34 may merge the one or more recommendations of the pre-existing dynamic interest report with the current dynamic interest report. Furthermore, the user device 34 may be notified when the user device 34 is within a proximity of a location that is associated with the one or more recommendations in the dynamic interest report based on location data associated with the user as obtained by the sensors 30. By way of example, when the user device 34 is within the proximity of a charity organization or event associated with a charity organization that is associated with the identified correlations, the user may receive a notification from the user device 34. Furthermore, any activity from the user device 34 associated with the dynamic interest report (e.g., interaction with provided links, viewing of text, image, and/or videos in the report, etc.) may be sent to the computing system 10. The computing system 10 may use the interaction data in the generation of future dynamic interest reports.

Figure 3:
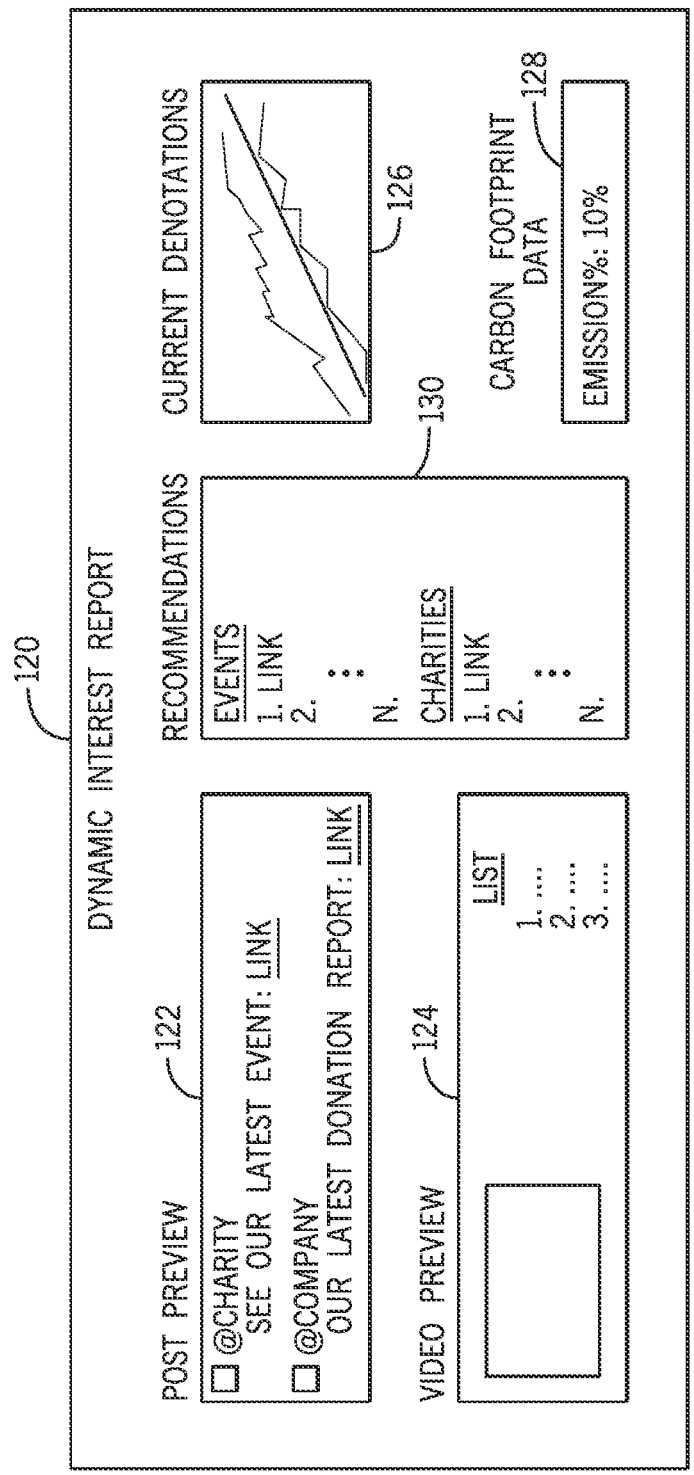
FIG. 3 illustrates an example of a dynamic interest report generated by the computing system, in accordance with an embodiment.

As discussed above, the dynamic interest report may include the one or more recommendations identified by the computing system displayed in a user-friendly manner. With the foregoing in mind, FIG. 3 illustrates an example of a dynamic interest report 120. The dynamic interest report 120 may be displayed on the user device 34. In some embodiments, the dynamic interest report 120 may be displayed on a smart device located in the property associated with the user.

The dynamic interest report 120 may include a post preview 122 to display posts from the scraped data. The post preview 122 may include one or more posts scraped from the social media data 26 and/or the electronic news sources data 32. The one or more posts may be from organizations (e.g., companies and charities) that the user is subscribed to on one or more social media platforms. In some embodiments, the computing system 10 may identify the one or more posts for the post preview 122 from the identified correlations. That is, the user may not be subscribed to the organization associated with the one or more posts from the identified correlations. Rather, the organization may be associated with a charity and/or cause associated with the user. Furthermore, the posts in the post preview 122 may contain a hyperlink originally found in original post from the social media site.

The dynamic interest report 120 may include a donation tracker 126. The donation tracker 126 may track and display one or more donations made by the user within a period of time. In some embodiments, the donation tracker 126 may track and display one or more donations made by one or more organizations. These organizations may be identified by the user and/or added to the donation tracker 126 in the dynamic interest report.

The dynamic interest report 120 may include an environmental impact report 128. The environmental impact report 128 may include one or more environmental impact metrics, such as a carbon footprint tracker, a gas consumption value, gallons of water saved, waste diversion, reduction of electricity usage, and any other relevant environmental impact metric. The environmental impact report may be tracked over a period of time and presented as a graph. The environmental dynamically updated by the computing system 10 at the time of the generation of the dynamic interest report.

The dynamic interest report 120 may include a recommendation list 130. The recommendation list 130 may list the one or more recommendations generated by the computing system 10 based on the identified correlations at block 112. The one or more recommendations may include events, activities, investments, products, posts, podcasts, and any other recommendations based on the identified correlations. By way of example, a first recommendation may include a food drive with an organization that is associated with a user associated cause and/or organization. In a further example, a second recommendation may include one or more environmental conscious companies for investment by the user.

As discussed above, an ESG event model based on the calendar data of one or more users in an organization may be generated by the computing system 10 to facilitate recommendations for the one or more users and coordination between the one or more users in an organization. That is, the computing system 10 may recommend cost-saving and time-saving actions and/or one or more ESG events to the one or more users in the organization.

Figure 4:
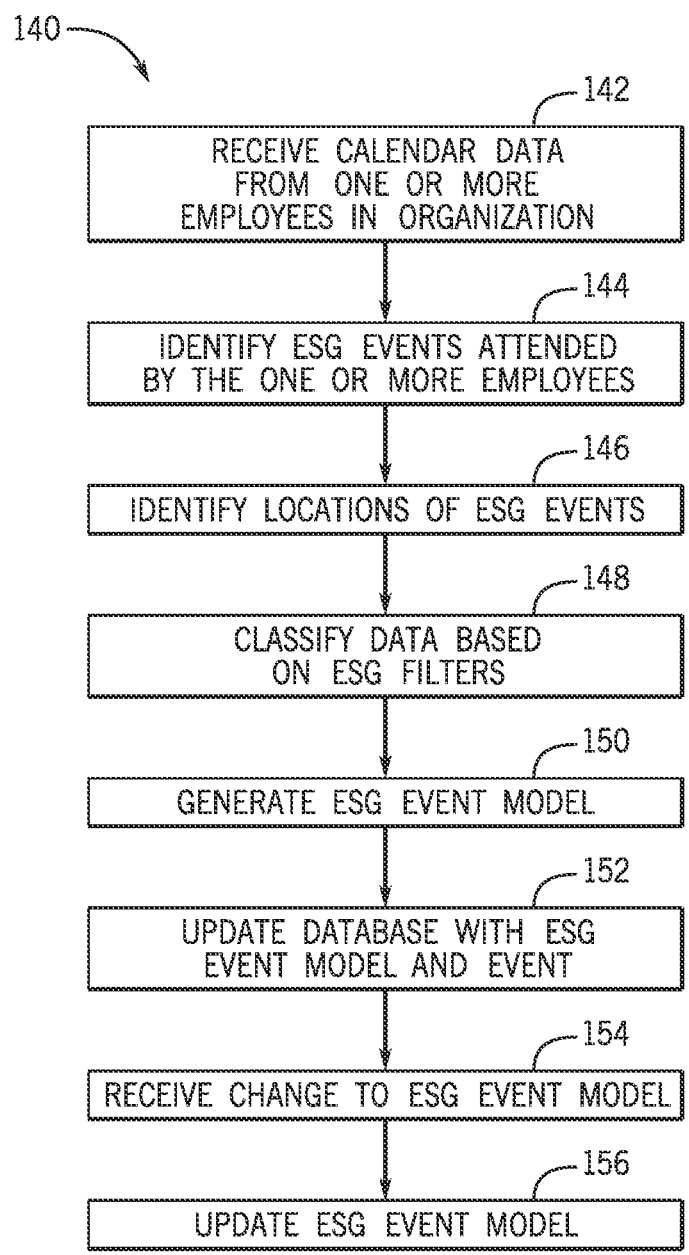
FIG. 4 illustrates a flowchart of a method for generating the ESG event model based on calendar data, in accordance with an embodiment.

With the foregoing in mind, FIG. 4 illustrates a method 140 for generating the ESG event model based on calendar data. Although the method 140 is described as being performed by the computing system 10, it should be noted that method 140 may be performed by any suitable electronic device with one or more processors.

At block 142, the computing system 10 may receive employee calendar data from one or more employees in an organization. The computing system 10 may request the employee calendar data from the databases 44, the cloud storage data 28, and/or the calendar data 38 of the user device 34. The employee calendar data may be associated with one or more departments in the organization. That is, different calendars for different departments may be received by the computing system 10.

At block 144, the computing system 10 may identify one or more events attended by the one or more employees. The computing system 10 may identify events in the calendar data received at block 142 by processing the calendar data through the ESG filters. The computing system 10 may use the ESG filters and/or keywords to identify the one or more events, where the one or more events may include events that promote environmental consciousness, community building, and/or any other relevant event that adheres to ESG compliance.

At block 146, the computing system 10 may identify locations of the one or more events. That is, the computing system 10 may acquire location data stored in the calendar data and/or location data from the user device 34. Additionally, when the computing system 10 determines that one or more events have a location within a proximity of another event, the computing system 10 may store the events and the location proximity within the database 44 for future usage. Furthermore, the computing system 10 may identify times in which one or more users may be going to the same particular geographical location.

At block 148, the computing system 10 may classify the event data based on the ESG filters. The event data from each identified event may be assigned to an ESG category based on the ESG filters. As described above, the environmental filter may be associated with environmentally conscious events, actions performed by organizations to promote environmental consciousness, environmentally-friendly purchases, combating climate change, preservation of natural resources, combating pollution and waste, renewable energy projects, and any other activity that may be associated with a low-emission, environmentally friendly action. The social filter may be associated with equality promoting measures, human rights, labor standards, exposure of illegal and immoral actions, local community promotions, improved access to healthcare, communications, and finance, product safety, non-controversial sourcing of materials, and any other activity that may be associated with a positive societal impact. Furthermore, the governance filter may be associated with ethical business decisions, anti-competitive practices, tax and income transparency, anti-corruption tactics, financial stability, diversity-focused hiring and practices, moral accounting, general transparency, and any other activity that may be associated with ethical business practices.

At block 150, the computing system 10 may generate an ESG event model based on the identified events. The ESG event model may be a dynamic model linking together the one or more identified events based on the ESG filtered data to implement cost-saving and/or time-saving measures among the one or more employees. That is, the ESG event model may recommend events to the employees of one or more departments, coordinate events and/or planning between one or more departments, recommend joint department event attendance and activities to the recommended events, and/or any additional recommendations for cost-saving and/or time-saving measures based on the ESG event model. In some embodiments, a digital board may be generated based on the ESG event model, such that the digital board may be transmitted to computer devices of the individuals that may have linked events.

After generating the ESG event model, the computing system 10 may send a notification to the user devices 34 or any other computing device to notify the users of the identified events that may allow the users to share resources, attend similar events, or the like. The notifications may be provided via a push notification or other suitable communication method as described. The user devices 34 may then present the notification and/or a recommendation for the respective user to attend the identified event. In some embodiments, the event notification may include a map application link that may automatically provide directions to the event based on the location data of the user device 34 and the event location with or without receiving input from the user. In this way, the user device 34 may automatically direct the user to the event.

By employing the techniques described in the present disclosure, the systems and methods described herein may allow for generation of the dynamic interest report 120 for a user and an ESG event model for one or more employees in an organization. The computing system 10 may be communicatively coupled to one or more data sources to receive published internet data and user device 34 data. The computing system 10 may identify correlations between user data and scraped internet data to generate the dynamic interest report 120 for the user. The dynamic interest report 120 may include one or more recommendations for the user based on associated ESG events and social media data. The computing system 10 may further generate the ESG event model for one or more employees in an organization to recommend one or more cost-saving and/or time-saving actions.

While only certain features of the present disclosure have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A system, comprising:
  one or more data sources associated with a user and related to one or more environmental parameters, one or more social parameters, one or more governance parameters, or any combination thereof;
  a computing system communicatively coupled to the one or more data sources, wherein the computing system is configured to:
    scrape published internet data from the one or more data sources based on the one or more environmental parameters, the one or more social parameters, the one or more governance parameters, or any combination thereof;
    receive user data from an account database, a user device, or both, wherein the user data comprises browser history activities that correspond to the one or more environmental parameters, the one or more social parameters, the one or more governance parameters, or any combination thereof;
    scrape calendar data from one or more electronic calendars stored on the user device to identify one or more events associated with the user, wherein the one or more events occurred previously, are scheduled for one or more future times, or both, and wherein the one or more events correspond to the one or more environmental parameters, the one or more social parameters, the one or more governance parameters, or any combination thereof;
    identify one or more correlations between the browser history activities of the user data, the published internet data, and the calendar data, wherein the one or more correlations are associated with one or more relationship between the user and the one or more environmental parameters, the one or more social parameters, the one or more governance parameters, or any combination thereof;
    generate a dynamic interest report based on the one or more correlations, wherein the dynamic interest report comprises one or more recommendations, wherein the one or more recommendations comprise one or more additional events associated with environmental, social, and governance (ESG) compliance;
    receive location data associated with the user device; and
    send a notification associated with the dynamic interest report to the user device in response to the location data indicating that a location of the user device is within a proximity to the one or more additional events, wherein that user device is configured to display the dynamic interest report in response to receiving the notification.

2. The system of claim 1, wherein the computing system is configured to scrape published internet data based on one or more identifiers associated with one or more data items and the one or more environmental parameters, the one or more social parameters, the one or more governance parameters, or any combination thereof.

3. The system of claim 2, wherein the one or more identifiers comprises a hashtag.

4. The system of claim 1, wherein the one or more environmental parameters comprise one or more environmentally conscious events, one or more actions performed by organizations to promote environmental consciousness, one or more environmentally-friendly purchases, or one or more actions to combat climate change, preserve natural resources, combat pollution and waste, increase renewable energy projects, or any combination thereof.

5. The system of claim 1, wherein the one or more social parameters comprise one or more equality promoting measures, one or more human rights, one or more labor standards, one or more local community promotions, or any combination thereof.

6. The system of claim 1, wherein the one or more governance parameters comprise one or more anti-competitive practices, one or more anti-corruption tactics, one or more diversity-focused hiring and practices, or any combination thereof.

7. A method, comprising:
  scraping, via a processor, published internet data from one or more data sources based on one or more environmental parameters, one or more social parameters, one or more governance parameters, or any combination thereof;
  receiving, via the processor, user data from an account database, a user device, or both, wherein the user data comprises browser history activities that correspond to the one or more environmental parameters, the one or more social parameters, the one or more governance parameters, or any combination thereof;
  scraping, via the processor, calendar data from one or more electronic calendars stored on the user device to identify one or more events associated with the user, wherein the one or more events occurred previously, are scheduled for one or more future times, or both, and wherein the one or more events correspond to the one or more environmental parameters, the one or more social parameters, the one or more governance parameters, or any combination thereof;
  identifying, via the processor, one or more correlations between the browser history activities of the user data, the published internet data, and the calendar data, wherein the one or more correlations are associated with one or more relationships between the user and the one or more environmental parameters, the one or more social parameters, the one or more governance parameters, or any combination thereof;
  generating, via the processor, a dynamic interest report based on the one or more correlations, wherein the dynamic interest report comprises one or more recommendations, wherein the one or more recommendations comprise one or more additional events associated with environmental, social, and governance (ESG) compliance;

receiving, via the processor, location data associated with the user device; and sending, via the processor, a notification associated with the dynamic interest report to the user device in response to the location data indicating that a location of the user device is within a proximity to the one or more additional events, wherein the user device is configured to display the dynamic interest report in response to receiving the notification.

8. The method of claim 7, wherein the published internet data comprises one or more social media websites, one or more social media posts, or both.

9. The method of claim 7, wherein scraping the published internet data comprises employing an artificial intelligence tool configured to crawl the published internet data and identify a portion of the published internet data based on the one or more environmental parameters, the one or more social parameters, the one or more governance parameters, or any combination thereof.

10. The method of claim 7, wherein the dynamic interest report comprises one or more links configured to access one or more websites.

11. The method of claim 7, wherein the one or more environmental parameters comprise one or more environmentally conscious events, one or more actions performed by organizations to promote environmental consciousness, environmentally-friendly purchases, one or more actions to combat climate change, preservation of natural resources, combating pollution and waste, increasing renewable energy projects, or any combination thereof.

12. The method of claim 7, wherein the one or more social parameters comprise one or more equality promoting measures, one or more human rights, one or more labor standards, one or more local community promotions, or any combination thereof.

13. The method of claim 7, wherein the one or more governance parameters comprise one or more anti-competitive practices, one or more tax and income transparency practices, one or more anti-corruption tactics, one or more diversity-focused hiring and practices, or any combination thereof.

14. A non-transitory computer-readable medium comprising computer-executable instructions that, when executed, are configured to cause at least one processor to:

scrape published internet data from one or more data sources based on one or more environmental parameters, one or more social parameters, one or more governance parameters, or any combination thereof;

receive user data from an account database, a user device, or both, wherein the user data comprises browser history activities that correspond to the one or more environmental parameters, the one or more social parameters, the one or more governance parameters, or any combination thereof;

scrape calendar data from one or more electronic calendars stored on the user device to identify one or more events associated with the user, wherein the one or more events occurred previously, are scheduled for one or more future times, or both, and wherein the one or more events correspond to the one or more environmental parameters, the one or more social parameters, the one or more governance parameters, or any combination thereof;

identify one or more correlations between the browser history activities of the user data, the published internet data, and the calendar data, wherein the one or more correlations are associated with one or more relationships between the user and the one or more environmental parameters, one or more social parameters, one or more governance parameters, or any combination thereof;

generate a dynamic interest report based on the one or more correlations, wherein the dynamic interest report comprises one or more recommendations, wherein the one or more recommendations comprise one or more additional events associated with environmental, social, and governance (ESG) compliance;

receive location data associated with the user device; and send a notification associated with the dynamic interest report to the user device in response to the location data indicating that a location of the user device is within a proximity to the one or more additional events, wherein the user device is configured to display the dynamic interest report in response to receiving the notification.

15. The non-transitory computer-readable medium of claim 14, wherein the published internet data comprises one or more social media websites, one or more social media posts, or both.

16. The non-transitory computer-readable medium of claim 14, wherein the computer-executable instructions that cause the at least one processor to scrape the published internet data comprises employing an artificial intelligence tool configured to crawl the published internet data and identify a portion of the published internet data based on the one or more environmental parameters, the one or more social parameters, the one or more governance parameters, or any combination thereof.

17. The non-transitory computer-readable medium of claim 14, wherein the dynamic interest report comprises one or more links configured to access one or more websites.

18. The non-transitory computer-readable medium of claim 17, wherein the computer-executable instructions are configured to cause the at least one processor to scrape the published internet data based on one or more identifiers associated with one or more data items and the one or more environmental parameters, the one or more social parameters, the one or more governance parameters, or any combination thereof.

19. The non-transitory computer-readable medium of claim 18, wherein the one or more identifiers comprises a hashtag.

20. The method of claim 9, wherein the portion of the published internet data comprises a hashtag.

* * * * *